United States Patent
Bakke et al.

[15] 3,694,505
[45] Sept. 26, 1972

[54] METHOD OF PRODUCING O-AMINOBENZAMIDE

[72] Inventors: Jan Magnus Bakke; Harald Erik Heikman; Christer Lennart Hakanson, all of Karlskoga; John Martin Nilsson, Solna, all of Sweden

[73] Assignee: Aktiebolaget Bofors, Bofors, Sweden

[22] Filed: Jan. 26, 1970

[21] Appl. No.: 5,921

[30] Foreign Application Priority Data

Jan. 28, 1969 Sweden ..................... 1081/69

[52] U.S. Cl. .............................................. 260/558 A
[51] Int. Cl. .............................................. C07c 103/28
[58] Field of Search ................................. 260/558 A

[56] References Cited

OTHER PUBLICATIONS

C.A. Vol. 69: 67009 c, (1968), Kozlov et al.
Z. Anorg. Allgem. Chemie, Vol. 322: 212– 214, (1963), Volter et al.

Primary Examiner—Henry R. Jiles
Assistant Examiner—S. D. Winters
Attorney—Hane, Baxley & Spiecens

[57] ABSTRACT o-Aminobenazmide is prepared by the reaction in the gaseous phase of o-nitrotoluene and ammonia at a temperature about 500 to 650°C.

3 Claims, No Drawings

METHOD OF PRODUCING O-AMINOBENZAMIDE

The present invention relates to a method of producing o-aminobenzamide. This compound is of great value as a raw material for further processing in the chemical industry. Thus, starting with o-aminobenzamide, through simple chemical reactions it is possible to obtain, for instance, o-aminobenzylamine, antranilic acid and antranilic acid derivatives. The o-aminobenzamide is also of interest as a base product for polymers. Hitherto, however, the o-aminobenzamide has not been readily available, since, for the production of this compound, as a rule it has been necessary to start with o-nitro-benzamide, o-nitro-benzonitrile or isatoic anhydride, all of which compounds themselves are expensive to produce and, consequently, also not readily available.

Through the present invention it has now become possible to produce o-aminobenzamide in a simple and technically satisfactory way. This method of producing o-aminobenzamide is characterized according to the present invention in that o-nitro-toluene and ammonia are allowed to react with each other in a gas phase at a temperature exceeding 400°C. The reaction temperature can appropriately be kept between 500° and 650°C, and the molar ratio between the ammonia and the o-nitro-toluene can advantageously be between 1:1 and 100:1. The reaction can also be carried out in the presence of an inert gas. delimit The invention will now be described in more detail, with reference to the following examples, which, however, are only given as an illustration of the invention, but do not delimint it as it is defined in the attached claims.

EXAMPLE 1

Vaporized o-nitro-toluene (ONT) and ammonia were mixed with the molar ration ($NH_3$ : ONT) 6.3 : 1 and conveyed through a reactor consisting of a heated quartz tube filled with pieces of quartz. The reactor temperature was 500°C, and the mixture was kept in the reactor for 10 seconds. The output reaction mixture was cooled, and after the liquid components had been filtered off, a crystalline residue was obtained, from which pure o-aminobenzamide was obtained through re-crystallization. The o-aminobenzamide was identified through the melting point, as well as through IR spectroscopy.

Through gas-chromatographic analysis, it was determined that 30 percent of the o-nitro-toluene had been reacted in the reaction product, and that the yield of o-aminobenzamide amounted to 43 percent, counted on the reacted o-nitro-toluene.

EXAMPLES 2–10

These examples were carried out entirely in analogy with Example 1, but the conditions were varied in the way indicated in the attached table, in which also the results obtained will be found. The data for Example 1 is also included in the table.

EXAMPLE 11

Also this example was carried out entirely in analogy with Example 1, but with the difference that the gas mixture conducted to the reactor also contained nitrogen gas. In this case, the molar ratio ammonia: o-nitro-toluene: nitrogen gas was 3.1:1:3.1. The reaction conditions and the result obtained in Example 11 are also indicated in the attached table.

TABLE

| Example No. | Reactor temp. | Molar ratio ammonia:o-nitro-toluene ($NH_3$:ONT) | Reaction time in seconds | Reacted o-nitro-toluene, percent | Yield of o-aminobenzamide counted in percent of reacted o-nitro-toluene |
|---|---|---|---|---|---|
| 1 | 500 | 6.3/1 | 10 | 30 | 43 |
| 2 | 550 | 6.3/1 | 10 | 80 | 39 |
| 3 | 600 | 6.3/1 | 10 | 100 | 22 |
| 4 | 650 | 6.3/1 | 10 | 100 | 15 |
| 5 | 550 | 1.5/1 | 10 | 81 | 28 |
| 6 | 550 | 3.1/1 | 10 | 80 | 42 |
| 7 | 550 | 20/1 | 10 | 87 | 43 |
| 8 | 550 | 63/1 | 10 | 82 | 47 |
| 9 | 550 | 20/1 | 1.4 | 37 | 36 |
| 10 | 550 | 20/1 | 20 | 95 | 28 |
| 11 | 550 | 3.1:1:3.1* | 10 | 90 | 22 |

*Nitrogen gas.

As will be noted from the table, through the present invention it has now become possible, in a simple way and with a good yield, to directly produce o-aminobenzamide from the cheap and readily available raw materials o-nitro-toluene and ammonia.

We claim:

1. A method of producing o-aminobenzamide from o-nitrotoluene and ammonia, which consists essentially of heating the reactants in the gaseous phase in the presence of quartz at a temperature of about 500° to 650°C.

2. A method according to claim 1 wherein the molar ratio of ammonia to o-nitrotoluene is between 1:1 and 100:1.

3. A method according to claim 2 wherein the reaction is carried out in the presence of an inert gas.

* * * * *